E. J. & D. R. FREDERICKS.
TROLLEY WHEEL.
APPLICATION FILED SEPT. 27, 1907.
903,698.
Patented Nov. 10, 1908.
2 SHEETS—SHEET 2.
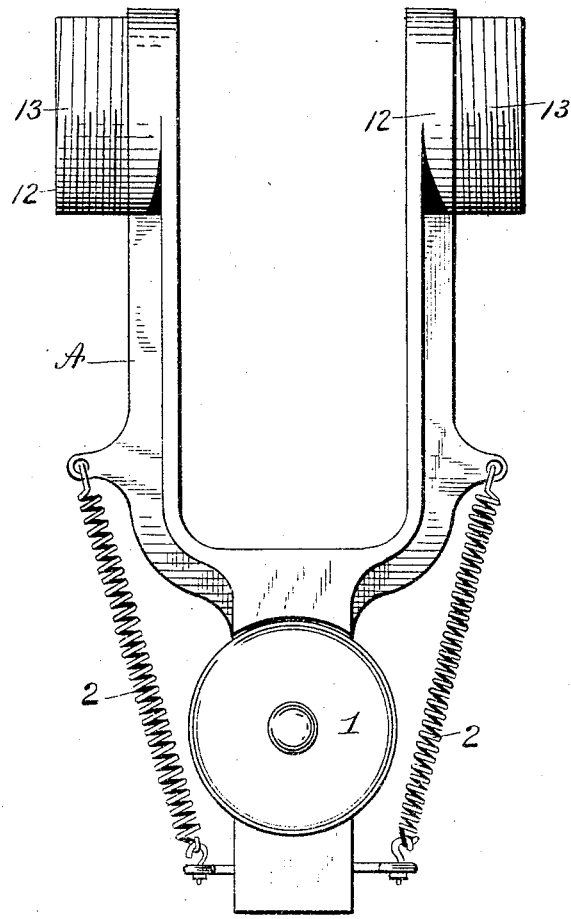
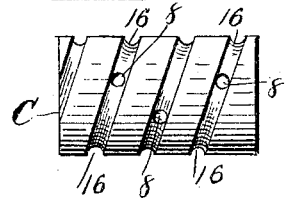
Witnesses
F. L. Ourand
Watts T. Estabrook
Inventors
Edmund J. Fredericks
Dilla R. Fredericks.
By Louis Bagger & Co.
their Attorneys

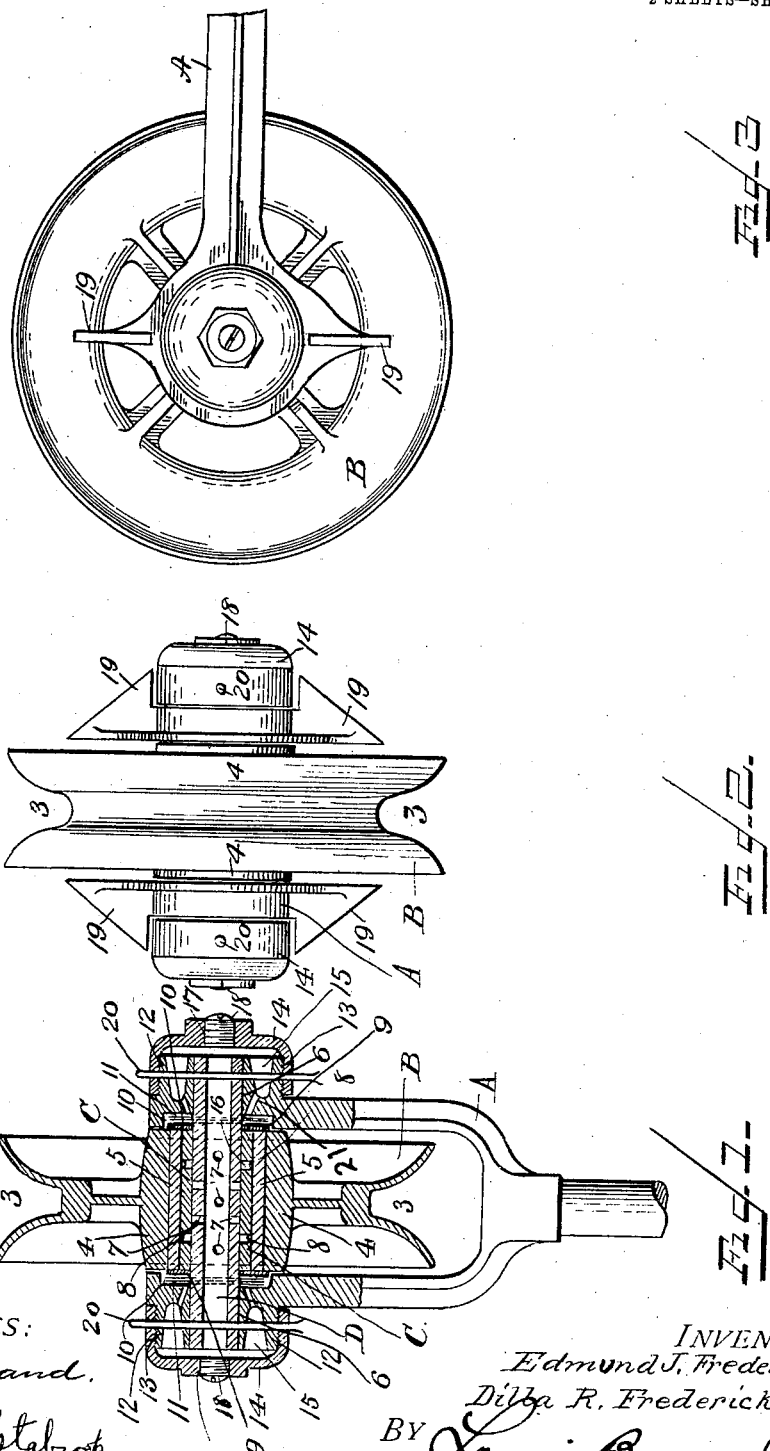

UNITED STATES PATENT OFFICE.

EDMUND J. FREDERICKS AND DILLA R. FREDERICKS, OF OHIO, ILLINOIS, ASSIGNORS OF ONE-FOURTH TO LUCIEN F. HUTCHENS, ONE-EIGHTH TO MINNIE REMSBURG, AND ONE-EIGHTH TO DORA CHASE, ALL OF CONNEAUT, OHIO.

TROLLEY-WHEEL.

No. 903,698.      Specification of Letters Patent.      Patented Nov. 10, 1908.

Application filed September 27, 1907. Serial No. 394,935.

*To all whom it may concern:*

Be it known that we, EDMUND J. FREDERICKS and DILLA R. FREDERICKS, citizens of the United States, residing at Ohio, in the county of Bureau and State of Illinois, have invented certain new and useful Improvements in Trolley-Wheels, of which the following is a specification.

Our invention relates to an improvement in trolley wheels, and the object is to form a bearing surface where the friction on the wearing parts will be lessened and at the same time give better results.

Another object is to provide means for lubricating the different parts through the axle of the wheel and to provide a harp which has a pivotal connection, so that the trolley will be to a great extent prevented from leaving the wire.

The invention relates to certain other novel features of construction and combinations of parts which will be hereinafter described and pointed out in the claims.

In the accompanying drawings, Figure 1 is a vertical sectional view; Fig. 2 is an end view; Fig. 3 is a side view; Fig. 4 is a side elevation of the harp, and Fig. 5 is a perspective view of the sleeve which surrounds the axle.

A represents the harp, which is provided with a knuckle joint 1 to permit the harp to have a pivotal movement, and springs 2, 2 connected to the sides of the harp and extending down below the pivotal connection tend to keep the harp in the desired position. The harp is provided at its upper end with openings 6, 6 for the reception of the hollow steel axle D, which is provided with perforations 7, 7.

B represents the wheel having the usual groove 3 for the wire. The hub 4 of the wheel is lined with a stationary hardened steel bushing 5 to prevent the wear of the copper wheel on the hub. Loosely mounted on the axle D is a steel sleeve C having perforations 8, 8 therein. The steel bushing 5 is loosely mounted on the sleeve C, and the sleeve C is provided with spiral grooves 16 on its upper surface for conveying the oil or lubricant to the bushing. The bushing 5 and the steel sleeve C are flush with the hub 4 of the wheel B, and mounted on the axle D are copper washers 9, which are received in recesses 10, 10 in the harp which are held against the hub, bushing and sleeve by coil springs 11.

Projections 12, 12 extend out from the sides of the harp and are provided with screw threads 13 adapted to receive the caps 14. Between these caps and the harp an oil or lubricant chamber 15 is formed, which supplies the lubricant to the hollow axle D and through the perforations 7, 7 of the axle passes to the sleeve C and from the sleeve through the perforations 8 and the spiral grooves 16 to the bushing 5 of the hub 4, thereby lubricating all of the parts. The caps 14 are provided with openings 17 for filling the chambers 15 with lubricant extending from the chambers 15 are ducts 21 to the axle and washers. These openings 17 have screw-threaded plugs 18 therein for closing the openings. Mounted on the harp and preferably forming an integral part thereof are the guards 19, which extend nearly to the outer edge of the wheel B and also out over the caps 14 to prevent the wire from striking the caps or ends of the harp and catching in case the wheel should jump the wire. Extending through the cap 15, harp, and axle D are steel pins or split keys 20, which tend to keep the axle stationary. The copper washers 9 which bear against the ends of the hub 4, bushing 5 and sleeve C, act as electrical conductors for conducting the current from the wheel to the harp.

It is evident that many slight changes might be made in the form and arrangement of the several parts described without departing from the spirit and scope of our invention, and hence we do not wish to limit ourselves to the exact construction herein set forth, but:—

Having fully described our invention, what we claim as new and desire to secure by Letters Patent, is:—

1. In a trolley wheel, the combination with a harp having oil chambers formed therein, caps adapted to close the ends of the chambers, of a hollow axle mounted in the harp having apertures formed therein, a sleeve mounted on the axle, said oil chambers communicating with the axle whereby the oil is conducted to the wheel.

2. In a trolley wheel, the combination with a harp having oil chambers formed therein, caps for closing the oil chambers, of a hollow axle mounted in the harp having perforations therein, a sleeve mounted on the axle and having a spiral groove thereon, the sleeve having apertures extending through the groove, said chambers in communication with the axle whereby the lubricant is conducted to the wheel, and means for refilling the chambers without removing the caps.

3. In a trolley wheel, the combination with a harp having oil chambers formed in the axle bearings, an axle mounted in the harp, a sleeve mounted on the axle, and washers adapted to bear against the wheel and sleeve, said oil chambers having ducts therein for conveying oil to the axle and washers.

In testimony whereof we affix our signatures in presence of two witnesses.

EDMUND J. FREDERICKS.
DILLA R. FREDERICKS.

Witnesses:
HANNAH McCORMICK,
MINNIE D. REMSBURG.